Patented Dec. 4, 1951

2,577,627

UNITED STATES PATENT OFFICE 2,577,627

GLASS COMPOSITION AND METHOD OF MAKING SAME

Alexis G. Pincus, Southbridge, Mass., assignor to American Optical Company, Southbridge, Mass., a voluntary association of Massachusetts No Drawing. Application May 1, 1947, Serial No. 745,239

10 Claims. (Cl. 106—47)

This invention relates to fluoride resistant glasses and has particular reference to a glass which is highly resistant to attack by hydrofluoric acid, anhydrous hydrogen fluoride and fluorides in general, and to improved compositions and methods of making the same.

One of the principal objects of the invention is to provide glasses of the above character, improved compositions therefor and methods of making the same, which can be fabricated in large scale commercial production by known commercial methods and within the usual temperature ranges, and which possess characteristics enabling refabrication while retaining a transparent homogenous vitreous nature.

A further object is to provide a glass composition of the above nature consisting essentially of the metaphosphates of metallic elements of low atomic weight so that the resulting glass has a relatively high percentage of $P_2O_5$ and method of making the same whereby, during melting, a minimum loss of $P_2O_5$ by volatilization will occur and which melt can be cooled and fabricated without harmful tendency to form crystals, ream or other loss of homogeneous, transparent, vitreous characteristics.

Another object is to provide a zinc aluminum phosphate type of glass containing a controlled amount of boric oxide.

A further object of the invention is to provide a glass substantially free from attack by fluoride vapors, hydrofluoric acid, which glass consists essentially of phosphorus pentoxide, an ingredient or ingredients selected from the group consisting of aluminum oxide and boric oxide and an ingredient or ingredients selected from the group consisting of one or more of the bivalent oxides: beryllium oxide, magnesium oxide and zinc oxide, and with or without the addition of minor ingredients such as fluorine, alkali oxides and calcium oxide.

Other objects and advantages of the invention will become apparent from the following description and it will be apparent that many changes may be made in the specific formulas, compositions and methods described herein without departing from the spirit of the invention as expressed in the accompanying claims. I, therefore, do not wish to be limited to the exact formulas, compositions and methods given herein as the preferred examples only have been set forth by way of illustration.

Fluoride resisting glasses are not new in the art. Several different attempts have been made to provide glasses possessing this characteristic but, in most instances, one or more undesirable characteristics have been encountered which have rendered most of these prior art glasses commercially impracticable. There are several characteristics which are required in glasses of this nature:

(1) That the glass first has a high resistance to attack by hydrofluoric acid, anhydrous hydrogen fluoride and fluorides in general;

(2) That the compositions be such that they may be readily fabricated by known commercial means;

(3) That they possess characteristics which will enable refabrication by heat or mechanical means without loss of desired transparency and homogeneity;

(4) That they possess high resistance to attack by water;

(5) And that they possess desirable and practical characteristics as to thermal expansion coefficient and resistance to breakage from thermal shock.

Some more recent glasses possessed most of the above desirable characteristics but it has been found that, when attempts have been made to form large commercial batches of such glasses, some difficulties as to the fabrication of the glasses occurred even though smaller size melts could be successfully fabricated.

The present invention, therefore, is directed to the obtaining of a glass possessing all of the above enumerated desirable characteristics and which may be made in large commercial melts and by known commercial processes or methods.

In Patent No. 2,381,925 issued August 14, 1945 to applicant, there are disclosed glasses resistant to hydrofluoric acid formed by combination of $P_2O_5$, $Al_2O_3$ and ZnO. BeO and PbO were mentioned in said patent as equivalents of ZnO. Small additions of alkali oxide or fluoride were mentioned therein also as assisting the melting and working of such glasses. In said patent it was mentioned that definite attempts were made to eliminate as far as possible any trace of silicon dioxide ($SiO_2$) or boric oxide ($B_2O_3$) for, as a result of research at that time and with the proportions of $P_2O_5$ and $Al_2O_3$ given, such ingredients proved detrimental to the fluoride resistance of the resultant glass.

It has been found, however, by research and experimentation that by increasing the $P_2O_5$ content to the upper limits set forth in said patent and by decreasing the $Al_2O_3$ content it now becomes practical to introduce $B_2O_3$ either as a substitute for the $Al_2O_3$ or for use in combination therewith, and thereby obtain compositions at this high $P_2O_5$ level which have better working characteristics as to large batch fabrication and making possible the obtaining of maximum durability against fluorides.

It has not only been found that $B_2O_3$ may now be added without detriment to the glass but that material amounts may be added with decidedly advantageous results. It has also been found that, with the proportions of $Al_2O_3$ or $B_2O_3$ set forth herein, the functions of ZnO may be exercised by the use of MgO, BeO and CaO either separately or jointly, although it is still preferred to use ZnO as the major bivalent oxide constituent.

The present invention relates to glass compositions as follows, in which are stated the range and parts by weight by which the various ingredients may be varied and also certain specific examples of actual formulas within this range which have produced desirable results:

| Ingredient | Range of Parts by weight | Parts by Weight Specific Examples | | |
|---|---|---|---|---|
| | | A | B | C |
| Phosphorus Pentoxide ($P_2O_5$) | 72–85 | 77 | 77 | 75 |
| Aluminum Oxide ($Al_2O_3$) | 5–9 | 8 | 8 | 7 |
| Boric Oxide ($B_2O_3$) | 1–8 | 5 | 5 | 5 |
| Bivalent Oxides (RO) | 1–12 | 10 | | |
| | | 100 | | |
| such as: | | | | |
| Zinc Oxide (ZnO) | | | 5 | 2 |
| Magnesium Oxide (MgO) | | | 5 | 3 |
| Beryllium Oxide (BeO) | | | 0 | 0 |
| Calcium Oxide (CaO) | | | 0 | 3.8 |
| *Optional Ingredients* | | | | |
| Fluorine | 0–5 | | 0 | 3.2 |
| Alkali Oxides | 0–1 | $Na_2O$ or $Li_2O$ | 0.1 | 0.5 |
| | | | 100.1 | 99.5 |

It will be noted by reference to the above that the $P_2O_5$ content is relatively high and, according to the present teachings, the higher the amount of $P_2O_5$ present, the more resistant the resultant glass will be to hydrofluoric acid attack.

In forming the glass batches for producing such glasses, it is desirable to so select the proportions of the ingredients that the positive elements are present in approximately the metaphosphate ratios. In order to maintain a high $P_2O_5$ content, it has been found best to use, as the metallic oxide constituents, elements of low atomic weight such as beryllium, aluminum, boron and magnesium. During the melting it is desirable to melt at a minimum temperature and for the shortest possible time to minimize loss of $P_2O_5$ by volatilization.

For example, actual chemical analyses of glasses obtained by semi-production scale meltings according to Example "C" indicated the following end results:

| | Melt #1 | Melt #2 |
|---|---|---|
| $P_2O_5$ | 74.12 | 72.85 |
| $Al_2O_3$ | 6.80 | 7.14 |
| ZnO | 2.86 | 2.58 |
| MgO | 3.26 | 3.90 |
| $B_2O_3$ | 5.38 | 5.41 |
| CaO | 5.14 | 5.88 |
| $Na_2O$ | 0.58 | 0.43 |
| $SiO_2$ | 0.27 | 0.17 |
| F | 0.55 | 0.58 |
| | 98.96 | 98.94 |

Melt No. 2 differed from melt No. 1 only in being held in the furnace about 12 hours longer. The major difference between the two is the lower $P_2O_5$ content of melt No. 2. The glasses of the above melts were subjected to a hydrofluoric acid test such as will be described in more detail hereinafter, and melt No. 2 was attacked at an appreciably higher rate than melt No. 1 (0.15 as compared with 0.10).

In the forming of a glass melt such as given in Example B above, the desired composition may be derived from a batch consisting of:

| | Parts by weight |
|---|---|
| Aluminum metaphosphate | 40 |
| Zinc metaphosphate | 14 |
| Magnesium metaphosphate | 23 |
| Boric acid crystals | 9 |
| Sodium nitrate | 0.2 |
| Phosphoric anhydride | 18 |

It will be noted that, as far as possible, metaphosphates are used as the raw materials because it has been found that this yields a dry, easily weighed and easily mixed batch with a minimum tendency to volatilize the $P_2O_5$ during melting. The said batch can be melted in any ordinary ceramic refractory, through preferably one of the high aluminum type, at a temperature of about 2500° F. The melting should be rapid and the furnace should not be held at this maximum temperature any longer than absolutely necessary for complete melting. Boron orthophosphate is available as a source of $B_2O_3$ and $P_2O_5$, and its use makes possible omission of phosphoric anhydride from the batch.

The melt can then be dropped to about 2000° F. for further homogenization and for working. The best working range has been found to lie between 1900° and 2200° F. The said melt has satisfactory working characteristics and the resultant glass can be lamp-worked without devitrification of the parent glass or surface greying during prolonged heating in a gas flame. That is, the glass will retain its initial inherent transparency throughout the melting, working and after working. The glass also lends itself well to the usual mechanical methods of shaping such as grinding with loose abrasives, polishing with rouge, cutting, edging and drilling. Glasses of this nature may also be annealed within the usual ranges and cooled slowly from approximately 1100° F. by conventional annealing methods.

It has been found that the glasses disclosed herein are resistant to a chemical test as follows:

A weighed test piece is immersed in 48% hydrofluoric acid at room temperature (usually 26 to 27° C., approximately 78° F.) for one hour without agitation. Then the piece is re-weighed and the results expressed as loss in weight per unit area per unit time (mgs. per sq. cm. per hour). By this test ordinary silicate glasses would be so rapidly corroded that they would be useless in less than one hour, while the glasses of the present invention show almost no visible attack after one hour, retain their transparency and exhibit weight losses of the order of $\frac{1}{10}$ mg. per sq. cm. per hour.

Specimens of glass such as set forth in Examples "B" and "C" have been used as containers for 48% hydrofluoric acid at relatively high room temperatures, and at the end of 592 hours had lost only 37.4 mg. per sq. cm. or 0.06 mg. per sq. cm. per hour. At the end of 4550 hours the loss in weight was about 224 mg. per sq. cm., or a rate of 0.05 mg. per sq. cm. per hour. Throughout the test the glass has remained transparent, and a slight film formed by fumes of HF above the liquid line can be readily rinsed off.

The above is true for glasses made on a large commercial scale and, while possessing these desired characteristics, further possess, as distinguished from applicant's issued patent mentioned above, characteristics which afford much greater ease of fabrication in large scale production and is therefore preferable to the glasses set forth in said issued patent.

While the glasses mentioned herein are highly resistant to hydrofluoric acid, they are also of excellent resistance to attack by water. For example, the particular glass batch "B" mentioned above has a water solubility of 1.8% by a standard laboratory test by which ordinary crown glass has a solubility of 4%. This low solubility in water is controlled primarily by the relative proportions of $P_2O_5$ and $Al_2O_3$, secondarily by the amount of $B_2O_3$, and only to a minor extent by the nature and amounts of the additional constituents. It has been found that, as $P_2O_5$ increased to the high levels of the present teachings, the minimum amount of $Al_2O_3$ required to maintain water solubility at low levels becomes lower than previously thought necessary. For example, a glass consisting of 75% $P_2O_5$ plus 5% $Al_2O_3$ plus 20% ZnO has a water solubility of 18%, whereas a glass consisting of 80% $P_2O_5$ plus 5% $Al_2O_3$ plus 15% ZnO has a water solubility of only 5%. Keeping $Al_2O_3$ constant at 10%, the effect on water solubility of lowering $P_2O_5$ by replacing it with ZnO was found to be:

| Per Cent $P_2O_5$ | Per Cent ZnO | Per Cent Water Solubility | HF Resistance |
|---|---|---|---|
| 80 | 10 | 1.7 | 0.1 |
| 75 | 15 | 1.3 | 0.2 |
| 70 | 20 | 2.6 | 0.9 |
| 65 | 25 | 11.0 | 8.5 |

According to the present invention, a wide variety of substitutions are possible provided the fundamental teachings are followed of maintaining the $P_2O_5$ at a high level of approximately 72% or more, $Al_2O_3$ at least at 5%, and including some $B_2O_3$, preferably about 5%. For example, alkalis may be introduced into such high $P_2O_5$ glasses but they should be kept low because of their unfavorable effects on thermal expansion. Sodium oxide ($Na_2O$) or potassium oxide ($K_2O$) can be as high as 1%, lithium oxide ($Li_2O$) as high as ½%. These alkali additions accelerate melting, lower critical temperatures and usually decrease devitrification tendency. Lithia ($Li_2O$) has the most favorable reactions in this high $P_2O_5$ range of 72 to 85%, presumably because it has the lowest atomic weight of these three alkali oxides.

Among the possible bivalent oxide constituents, barium oxide, lead oxide, cadmium oxide and strontium oxide are not essential, as far as hydrofluoric acid resistance is concerned, but their inclusion in small quantities in the glass formula may serve some useful purpose as, for example, they have been found to improve resistance against the ordinary mineral acids and alkalis.

Barium oxide particularly favors low water solubility even at low aluminum oxide content but, because the effects of these constituents on resistance to attack by hydrofluoric acid are generally in the wrong direction and because they lower the maximum $P_2O_5$ which can be maintained without excessive devitrification difficulties, their use in formulas of this type is not ordinarily desirable. However, where it is desired to include fluorine in the formula as discussed below, fluorspar (calcium fluoride) has been found to be an economical and desirable means of adding fluorine. As much as 5% of calcium fluoride has been added in certain formulas without detrimental effect. The bivalent oxides of cadmium and lead in appreciable proportions are undesirable in any formulas of high $P_2O_5$ content of 72% or more because they increase the tendency to devitrification.

The bivalent oxides of the elements of lowest atomic weight—beryllium and magnesium—differ sharply from the other bivalent oxides, promoting better workability and excellent hydrofluoric acid resistance at the 72 to 85% $P_2O_5$ level. A particularly useful formula is:

|  | Parts by weight |
|---|---|
| Phosphorus pentoxide ($P_2O_5$) | 85 |
| Aluminum oxide ($Al_2O_3$) | 5 |
| Boric oxide ($B_2O_3$) | 1 |
| Zinc oxide (ZnO) | 1 |
| Beryllium oxide (BeO) | 8 |
|  | 100 |

This formula melted and worked fairly well and had excellent durability against hydrofluoric acid (0.04 mg. per sq. cm. per hour), against water (1.3%), hydrochloric acid and sodium hydroxide.

In addition to the alkali oxides and bivalent oxides, it is also possible to include in the formula various polyvalent oxides such as the oxides of boron, silicon, arsenic and antimony. The beneficial effects of the introduction of boric oxides have already been described but it has been found that silica and the oxides of arsenic and antimony may also be added at the high $P_2O_5$ level of 72 to 85% without affecting the hydrofluoric acid resistance too unfavorably. The introduction of silica does not contribute any highly favorable effects to the glass but it is fortunate that its presence is not harmful because some silica is almost certain to be present in commercial glasses from attack on the refractories. Antimony and arsenic, particularly the latter, have been found to have favorable effects on workability and durability.

Other polyvalent oxides which it has been found can be included in the formula include those of titanium, tantalum, thorium, zirconium, lanthanum, tin, cerium, tungsten, vanadium, manganese and iron. These have not been found as practical as the preferred polyvalent ingredients set forth above because of less favorable effects on hydrofluoric acid resistance and workability, coloring effects in some cases, or because of the high cost compared to the preferred ingredients. If it is desired, however, in some particular instance to include any of these ingredients, they may be added in amounts of a fraction of 1% to approximately 12% depending upon the relative proportions of the other essential constituents.

Because the specific effects of substitutions vary with the base composition to which they are added, it is recommended that, before including any of these possible variants in the formula, their utility should be appraised when they are added to the particular base glass under study. Generally, these variants should be introduced in place of or partly in place of the bivalent oxide constituent of the general formula "A" quoted above.

It has also been found possible and in some cases desirable to include in the formula non-metallic elements such as fluorine, chlorine, sulphur and selenium. These may contribute specific desirable results such as accelerating melting, improving refining, lessening ream and modifying color. They would be added in relatively small amounts, usually less than 1%.

In general, it is preferable that the glass be of a clear, colorless, transparent nature, but it is pointed out, however, that if a colored glass is desired, suitable coloring agents such as cobalt, nickel, manganese, copper or iron may be included in the batch. These coloring ingredients or agents may be used without any appreciable effect upon the hydrofluoric acid resistance of the glass.

From the foregoing description, it will be seen that simple, efficient and economical means and method have been provided for accomplishing all the objects and advantages of the invention.

Having described my invention, I claim:

1. A glass resulting from the fusing together of:

| | Range of parts by weight |
|---|---|
| Phosphorus pentoxide ($P_2O_5$) | Approximately 75 |
| Aluminum oxide ($Al_2O_3$) | Approximately 7 |
| Boric oxide ($B_2O_3$) | Approximately 5 |
| Zinc oxide (ZnO) | Approximately 2 |
| Magnesium oxide (MgO) | Approximately 3 |
| Calcium oxide (CaO) | Approximately 3.8 |
| Fluorine | Approximately 3.2 |
| Sodium oxide ($Na_2O$) | Approximately 0.5 |

2. A glass resulting from the fusing together of:

| | Range of parts by weight |
|---|---|
| Phosphorus pentoxide ($P_2O_5$) | Approximately 77 |
| Aluminum oxide ($Al_2O_3$) | Approximately 8 |
| Boric oxide ($B_2O_3$) | Approximately 5 |
| and a | |
| Metal oxide | Approximately 10 | selected from the group consisting of zinc oxide (ZnO), magnesium oxide (MgO), beryllium oxide (BeO), calcium oxide (CaO) and mixtures thereof, its silica content, at most, being only of a negligible amount.

3. A glass resulting from the fusing together of:

| | Range of parts by weight |
|---|---|
| Phorphorus pentoxide ($P_2O_5$) | Approximately 77 |
| Aluminum oxide ($Al_2O_3$) | Approximately 8 |
| Boric oxide ($B_2O_3$) | Approximately 5 |
| Magnesium oxide (MgO) | Approximately 5 |
| Zinc oxide (ZnO) | Approximately 5 |
| Sodium oxide ($Na_2O$) | Approximately 0.1 |

4. A glass composition substantially as follows:

| | Range of parts by weight |
|---|---|
| Phosphorus pentoxide ($P_2O_5$) | Approximately 85 |
| Aluminum oxide ($Al_2O_3$) | Approximately 5 |
| Boric oxide ($B_2O_3$) | Approximately 1 |
| Zinc oxide (ZnO) | Approximately 1 |
| Beryllium oxide (BeO) | Approximately 8 |

5. The process of making a glass composition which is highly resistant to attack by hydrofluoric acid, the fluoride ion and fluoride vapors comprising the steps of mixing phosphorus pentoxide ($P_2O_5$) ranging from 72 to 85 parts by weight, aluminum oxide ($Al_2O_3$) ranging from 5 to 9 parts by weight, boric oxide ($B_2O_3$) ranging from 1 to 8 parts by weight and metal oxide selected from the group consisting of zinc oxide (ZnO), magnesium oxide (MgO), beryllium oxide (BeO), calcium oxide (CaO) and mixtures thereof comprising from 1 to 12 parts by weight, fluorine ranging from near 0 to 5 parts by weight and an alkali oxide selected from the group consisting of sodium oxide, lithium oxide, potassium oxide and mixtures thereof ranging from near 0 to 1 part by weight, and controlling the silica content to be at most of a negligible amount, heating the mixture to melt same completely in the neighborhood of 2500° F. and rapidly cooling the melt to a temperature in the neighborhood of 1800° to 2200° F. to allow working thereof, and thereafter slowly cooling the glass composition to room temperature.

6. The process of making a glass composition which is highly resistant to contact by hydrofluoric acid, the fluoride ion and fluoride vapors comprising mixing phosphorus pentoxide ($P_2O_5$) ranging from approximately 72 to 85 parts by weight, aluminum oxide ($Al_2O_3$) ranging from approximately 5 to 9 parts by weight, boric oxide ($B_2O_3$) ranging from approximately 1 to 8 parts by weight, and metal oxide selected from the group consisting of zinc oxide, calcium oxide, beryllium oxide, magnesium oxide and mixtures thereof approximately 1 to 12 parts by weight, and controlling the silica content to be, at most, only of a negligible amount, heating the mixture to melt the same completely in the neighborhood of 2500° F. and readily cooling the melt to a temperature in the neighborhood of 1800 to 2200° F. to allow working thereof, further permitting the glass to cool slowly to relieve mechanical strains.

7. A glass resulting from the fusing together of:

| | Range of parts by weight |
|---|---|
| Phosphorus pentoxide ($P_2O_5$) | Approximately 77 |
| Aluminum oxide ($Al_2O_3$) | Approximately 8 |
| Boric oxide ($B_2O_3$) | Approximately 5 |
| Magnesium oxide (MgO) | Approximately 5 |
| Zinc oxide (ZnO) | Approximately 5 |
| Lithium oxide ($Li_2O$) | Approximately 0.1 |

8. A substantially water-insoluble glass having high resistance to attack by the fluorine ion and consisting essentially of the following ingredients and percentages therefor by weight:

| | |
|---|---|
| Phosphorous pentoxide | 72 to 85 |
| Aluminum oxide | 5 to 9 |
| Boric oxide | 1 to 8 |
| Metal oxide from the group consisting of zinc oxide, magnesium oxide, beryllium oxide, calcium oxide and mixtures thereof | 1 to 12 | and the silica content, at most, being only of a negligible amount.

9. A substantially water-insoluble glass having high resistance to attack by the fluorine ion and consisting essentially of the following ingredients and percentages therefor by weight:

| | |
|---|---|
| Phosphorous pentoxide | 72 to 85 |
| Aluminum oxide | 5 to 9 |
| Boric oxide | 1 to 8 |
| Metal oxide from the group consisting of zinc oxide, magnesium oxide, beryllium oxide, calcium oxide and mixtures thereof | 1 to 12 | said glass containing an alkali oxide selected from the group consisting of lithium oxide, sodium oxide, potassium oxide and mixtures thereof, in proportion of less than one per cent, and with its silica content, at most, being only of a negligible amount.

10. A substantially water-insoluble glass having high resistance to attack by the fluorine ion and consisting essentially of the following ingredients and percentages therefor by weight:

| | |
|---|---|
| Phosphorous pentoxide | 72 to 85 |
| Aluminum oxide | 5 to 9 |
| Boric oxide | 1 to 8 |
| Metal oxide from the group consisting of zinc oxide, magnesium oxide, beryllium oxide, calcium oxide and mixtures thereof | 1 to 12 | said glass containing a halogen selected from the group consisting of fluorine and chlorine, with the proportion thereof being less than five per cent, and its silica content, at most, being only of a negligible amount.

ALEXIS G. PINCUS.

REFERENCES CITED

The following references are of record in the file of this patent:

UNITED STATES PATENTS

| Number | Name | Date |
|---|---|---|
| 1,961,603 | Berger | June 5, 1934 |
| 2,077,481 | Huppert et al. | Apr. 20, 1937 |
| 2,294,844 | Gelstharp | Sept. 1, 1942 |
| 2,423,128 | Tillyer | July 1, 1947 |